US007239492B2

(12) United States Patent
Heimbach et al.

(10) Patent No.: US 7,239,492 B2
(45) Date of Patent: Jul. 3, 2007

(54) CONTROL SYSTEM FOR AT LEAST ONE VACUUM INTERRUPTER GAP

(75) Inventors: Markus Heimbach, Düsseldorf (DE); Thomas Betz, Langenselbold (DE); Max Claessens, Gebenstorf (CH)

(73) Assignee: ABB Patent GmbH, Ladenburg (DE)

( * ) Notice: Subject to any disclaimer, the term of this patent is extended or adjusted under 35 U.S.C. 154(b) by 656 days.

(21) Appl. No.: 10/653,541

(22) Filed: Sep. 2, 2003

(65) Prior Publication Data

US 2004/0040935 A1 Mar. 4, 2004

(30) Foreign Application Priority Data

May 30, 2001 (DE) ................................ 101 26 148
Apr. 20, 2002 (DE) ................................ 102 17 743
May 4, 2002 (WO) ...................... PCT/EP02/04911

(51) Int. Cl.
*H02H 7/00* (2006.01)

(52) U.S. Cl. ............................................ 361/58; 361/8

(58) Field of Classification Search .................. 361/58, 361/8

See application file for complete search history.

(56) References Cited

U.S. PATENT DOCUMENTS 3,147,356 A 9/1964 Luehring .................... 200/145
4,305,107 A * 12/1981 Murano et al. ................ 361/4
4,725,701 A * 2/1988 Howell ........................ 218/118
6,498,315 B1 12/2002 Betz et al. .................. 218/120

FOREIGN PATENT DOCUMENTS

DE 199 12 022 A1 9/2000
EP 1 037 232 A2 9/2000
FR 1.434.407 2/1965

* cited by examiner

*Primary Examiner*—Stephen W. Jackson
(74) *Attorney, Agent, or Firm*—Laurence A. Greenberg; Werner H. Stemer; Ralph E. Locher

(57) ABSTRACT

A control system for at least one vacuum interrupter gap in a high-voltage switching device includes at least one non-reactive control resistor disposed in parallel with the vacuum interrupter. The non-reactive control resistor merges concentrically onto the vacuum interrupter chamber and is mechanically and electrically coupled thereto.

25 Claims, 3 Drawing Sheets

CONTROL SYSTEM FOR AT LEAST ONE VACUUM INTERRUPTER GAP

BACKGROUND OF THE INVENTION

1. Field of the Invention

The invention relates to a control system for at least one vacuum interrupter gap of a vacuum interrupter chamber. The invention may be used, for example, in high-voltage devices, the term "high-voltage" meaning that the voltage range is above 1000 V.

A high-voltage switching device with at least two vacuum interrupter chambers connected in series is disclosed in German Published, Non-Prosecuted Patent Application DE 199 12 022 A1, corresponding to U.S. Pat. No. 6,498,315 to Betz et al. Betz et al. state that the integration of the series configuration of two vacuum interrupter chambers requires a capacitive control system as the core piece of a high-voltage switching device, especially for use within a gas-insulating switchgear assembly. The background to this measure is the linearization of the voltage distribution over the series-connected vacuum interrupter chambers.

SUMMARY OF THE INVENTION

It is accordingly an object of the invention to provide a control system for at least one vacuum interrupter gap that overcomes the hereinafore-mentioned disadvantages of the heretofore-known devices of this general type and that provides a simplified control system for at least one vacuum interrupter gap.

With the foregoing and other objects in view, in a vacuum interrupter chamber having at least one vacuum interrupter gap, there is provided, in accordance with the invention, a control system having at least one non-reactive control resistor disposed in parallel with the vacuum interrupter gap, the at least one non-reactive control resistor merging concentrically onto the vacuum interrupter chamber and being mechanically and electrically coupled to the vacuum interrupter chamber.

With the objects of the invention in view, there is also provided a vacuum interrupter, including a vacuum interrupter housing defining a vacuum interrupter chamber having at least one vacuum interrupter gap and a control system having at least one non-reactive control resistor disposed in parallel with the vacuum interrupter gap, the at least one non-reactive control resistor merging concentrically onto the vacuum interrupter chamber and being mechanically and electrically coupled to the vacuum interrupter chamber.

The advantages that can be achieved by the invention are, in particular, that the potential control system that acts on a vacuum interrupter gap and the potential control system for a number of vacuum interrupter gaps connected in series are achieved using simple means and in a simple way. The proposed potential control system results in the transient voltage that occurs across the main contact gap after disconnection of a short-circuit current being shared uniformly. The maximum load on a vacuum interrupter gap is reduced, which has an advantageous effect on the configuration of the vacuum interrupter gap.

In accordance with another feature of the invention, there are provided an auxiliary contact gap and/or a disconnection/load disconnection contact gap connected in series with the vacuum interrupter gap.

In accordance with a further feature of the invention, there is provided an auxiliary contact gap connected in series with the non-reactive control resistor.

In accordance with an added feature of the invention, there is provided a screen of a vacuum chamber is in the non-reactive control system.

In accordance with an additional feature of the invention, there is provided a screen to be disposed in the vacuum interrupter chamber.

In accordance with yet another feature of the invention, the vacuum interrupter gap is at least two vacuum interrupter gaps and a multigap vacuum switch is connected in series with the at least two vacuum interrupter gaps and a non-reactive control system.

In accordance with yet a further feature of the invention, the vacuum interrupter gap is at least two vacuum interrupter gaps and a multigap vacuum switch is connected in series with the at least two vacuum interrupter gaps and the non-reactive control resistor.

In accordance with yet an added feature of the invention, there is provided a drive apparatus for coordinating a timing of a drive for the vacuum interrupter gap, the auxiliary contact gap, and/or the disconnection/load disconnection contact gap.

In accordance with yet an additional feature of the invention, the drive apparatus is a mechanical drive apparatus or an electronically controlled drive apparatus.

In accordance with again another feature of the invention, the auxiliary contact gap is an isolating switch or a switch disconnector. Also, the disconnection/load disconnection contact gap can be an isolating switch or a switch disconnector.

In accordance with again a further feature of the invention, the non-reactive control resistor is a conductive varnish having a complete coverage and a given layer thickness.

In accordance with again an added feature of the invention, the non-reactive control resistor is a partial coverage conductive varnish with a given layer thickness.

In accordance with again an additional feature of the invention, the non-reactive control resistor is a conductive varnish with a given layer thickness at least partially covering the vacuum interrupter chamber.

In accordance with still another feature of the invention, the non-reactive control resistor is a resistance mesh.

In accordance with still a further feature of the invention, there is provided an insulating material encapsulating the resistance mesh.

In accordance with still an added feature of the invention, there is provided a pole part and the non-reactive control resistor is a component of the pole part.

In accordance with still an additional feature of the invention, there is provided an outer shell and the non-reactive control resistor is a component of the outer shell. Preferably, the outer shell is an isolating tube.

In accordance with a concomitant feature of the invention, there is provided a mounting element and the non-reactive control resistor is a component of the mounting element.

Other features that are considered as characteristic for the invention are set forth in the appended claims.

Although the invention is illustrated and described herein as embodied in a control system for at least one vacuum interrupter gap, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
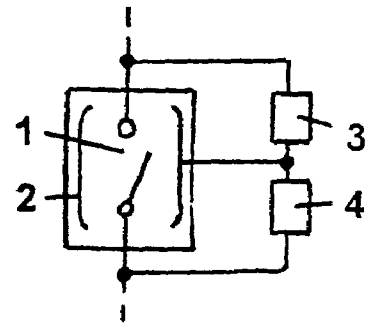
FIG. 1 is block and schematic circuit diagram of a vacuum interrupter gap with a control system according to the invention.

Referring now to the figures of the drawings in detail and first, particularly to FIG. 1 thereof, there is shown schematically a vacuum interrupter gap with a control system. The vacuum interrupter gap 1 (vacuum chamber, main-contact gap) has a screen 2 (screening electrode). A first, schematically illustrated, non-reactive control resistor 3 is disposed between the first main connection of the vacuum interrupter gap 1 and the screen 2. A second non-reactive control resistor 4 is located between the second main connection of the vacuum interrupter gap 1 and the screen 2.

Figure 2:
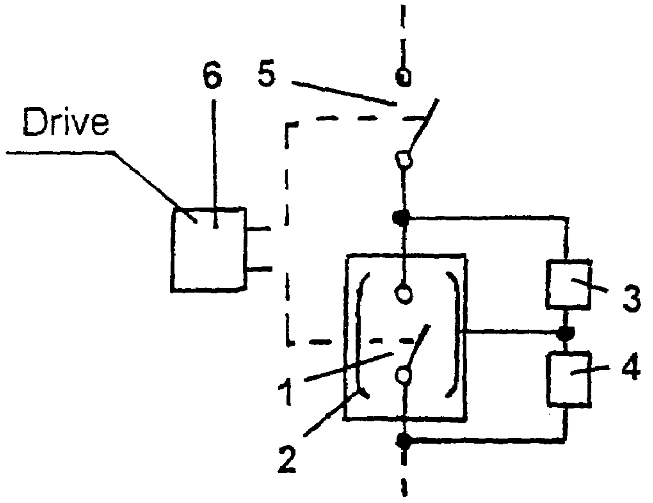
FIG. 2 is block and schematic circuit diagram of a vacuum interrupter gap with a control system and an auxiliary contact gap or disconnection/load disconnection contact gap according to the invention.

FIG. 2 shows, schematically, a vacuum interrupter gap with a control system and an auxiliary contact gap or disconnection/load disconnection contact gap. The embodiment with a vacuum interrupter gap 1, a screen 2, and non-reactive control resistors 3, 4 is described as for FIG. 1. In addition, there is an auxiliary contact gap or disconnection/load disconnection contact gap 5 in series with the vacuum interrupter gap 1. A drive apparatus 6 is used to coordinate the time of the drive for the vacuum interrupter gap 1 and auxiliary contact gap or disconnection/load disconnection contact gap 5.

Figure 3:
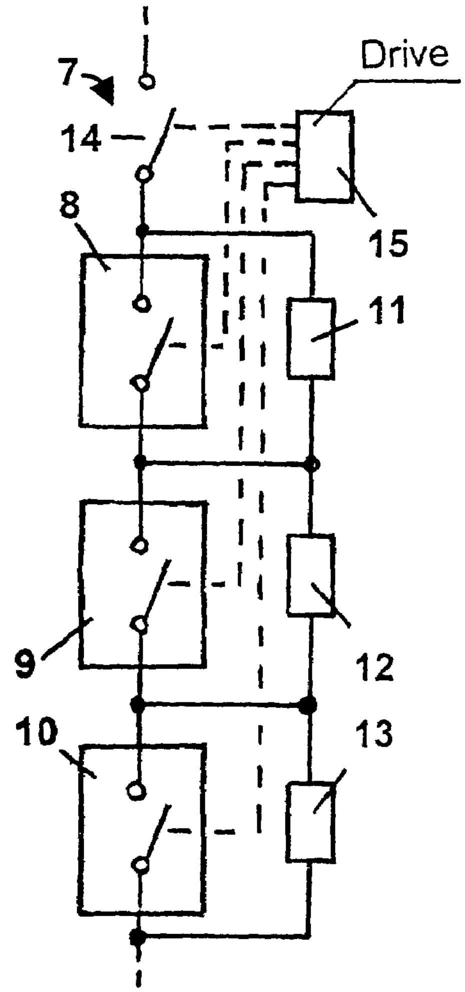
FIG. 3 is block and schematic circuit diagram of an embodiment of a multigap vacuum interrupter with a control system and an auxiliary contact gap or disconnection/load disconnection contact gap according to the invention.

FIG. 3 shows, schematically, a multigap vacuum interrupter with a control system and auxiliary contact gap or disconnection/load disconnection contact gap. The multigap vacuum disconnector 7 has three series-connected vacuum interrupter gaps 8, 9, 10, with a non-reactive control resistor 11, 12, or 13, respectively, being disposed in parallel with each vacuum contact gap 8, 9, or 10, respectively. An auxiliary contact gap or disconnection/load disconnection contact gap 14 is connected in series with the three vacuum interrupter gaps. A drive apparatus 15 is used to coordinate the timing of the drive for the vacuum interrupter gaps 8, 9, 10 and for the auxiliary contact gap or disconnection/load disconnection contact gap 14.

Figure 4:
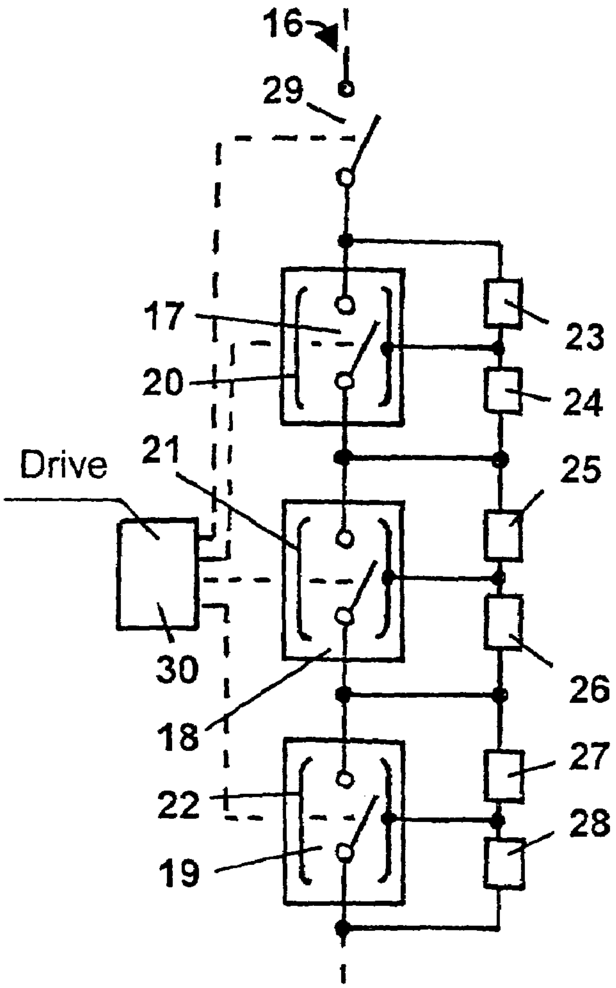
FIG. 4 is block and schematic circuit diagram of an alternative embodiment of the multigap vacuum interrupter of FIG. 3.

FIG. 4 shows, schematically, a further embodiment of a multigap vacuum interrupter with a control system and auxiliary contact gap or disconnection/load disconnection contact gap. In the embodiment of the multigap vacuum interrupter 16 of FIG. 4, three series-connected vacuum interrupter gaps 17, 18, and 19, respectively, are provided, which have respective screens 20, 21, and 22 (screening electrodes). A resistor is connected respectively between each main connection of a vacuum interrupter gap 17, 18, 19 and a connection to a screen 20, 21, 22, thus, resulting in a series circuit including a total of six resistors 23, 24, 25, 26, 27, 28 in parallel with the connections of the multigap vacuum interrupter 16. An auxiliary contact gap or disconnection/load disconnection contact gap 29 is connected in series with the three vacuum interrupter gaps. A drive apparatus 30 is used to coordinate the drive for the vacuum interrupter gaps 17, 18, 19 and for the auxiliary contact gap or disconnection/load disconnection contact gap 29.

With regard to the configuration of the vacuum interrupter gaps, it can be stated generally that they must ensure the current interruption—in particular, short-circuit current interruption and must withstand the transient voltage.

As can be seen from the following description of the figures, the potential control system for the vacuum interrupter gap 1 and for the multigap vacuum interrupters 7, 16 is provided by non-reactive control resistors, with these non-reactive control resistors being disposed in parallel with the vacuum interrupter gaps and producing a considerable reduction in the control error that always occurs due to the different earth capacitances. It is, thus, possible approximately to, ensure that the transient voltage that is produced across the contact gaps after the interruption of a current (short-circuit current) can be shared uniformly between these contact gaps, thus, leading to a reduction in the maximum load on one contact gap.

In such a case, the magnitude of the non-reactive control resistors must be configured such that the current flowing through them (the current in parallel with the main path) is at least in the same order of magnitude as the capacitive displacement current flowing through the respective vacuum interrupter gaps. The capacitive displacement current in this case depends on the magnitudes of the capacitances and the rate of change of the transient voltage. The influence of the non-reactive control resistors becomes greater the smaller their sizes, or, in other words, the non-reactive control system must have a sufficiently low impedance to ensure that the transient voltage is shared considerably more uniformly between the main contact gaps. Furthermore, the non-reactive control resistors can also be coupled to the screen of the vacuum chambers to allow the potential of the screen to be controlled as well, as can be seen from FIGS. 1, 2, and 4.

Due to the leakage current that flows in the steady state through the non-reactive control resistors, which are disposed in parallel with the vacuum interrupter gaps, when the vacuum interrupter gaps are open, an auxiliary contact gap or disconnection/load disconnection contact gap must be disposed in series with the main contact gaps and control resistors, to interrupt this predominantly resistive leakage current. Due to the size of the non-reactive control resistors, the current to be interrupted is, however, several orders of magnitude less than any short-circuit current that may occur so that the auxiliary contact gap or disconnection/load disconnection contact gap can be configured to be much simpler in terms of the current to be interrupted. The auxiliary contact gap or disconnection/load disconnection contact gap represents, however, not only a disconnection gap for the non-reactive control resistors, but also carries out the disconnection function with respect to the vacuum interrupter gaps. The auxiliary contact gap or disconnection/load disconnection contact gap must, therefore, be able to carry both the operational currents and short-circuit currents. An isolating switch or a switch disconnector, for example, may be used as the auxiliary contact gap or disconnection/load disconnection contact gap.

In such an embodiment, the requirement for the cold withstand voltage (rated short-term alternating voltage and rated short-term lightning surging voltage) of the main contact gaps can be reduced considerably.

The drive apparatuses 6, 15, 30 provide time control such that the auxiliary contact gap or disconnection/load disconnection contact gap opens shortly after the short-circuit current interruption (opening of the main contact gaps), in order to prevent thermal overloading of the non-reactive control resistors.

The non-reactive control resistors may be in the form of conductive varnish. The coating may, in such a case, be configured such that it provides a partial or complete cover. The layer thickness of the varnish can be varied depending on the application.

The non-reactive control resistors may also be in the form of a resistance mesh, in which the resistance mesh may also be encapsulated with an insulating material. "Weaving" a resistance wire onto an insulating tube may, for example, produce such a resistance mesh.

The non-reactive control resistors may be a component of a pole part, for example, in the form of an inner R varnish layer (resistance varnish layer), and, furthermore, they may be a component of an outer shell (which copes with the mechanical loads) or a component of a mounting element for the vacuum chamber or for the multigap vacuum interrupter, for example, a plastic threaded rod.

The drive apparatus 6, 15, 30 mentioned above may be configured such that they are controlled both mechanically and electronically.

Figure 5A:
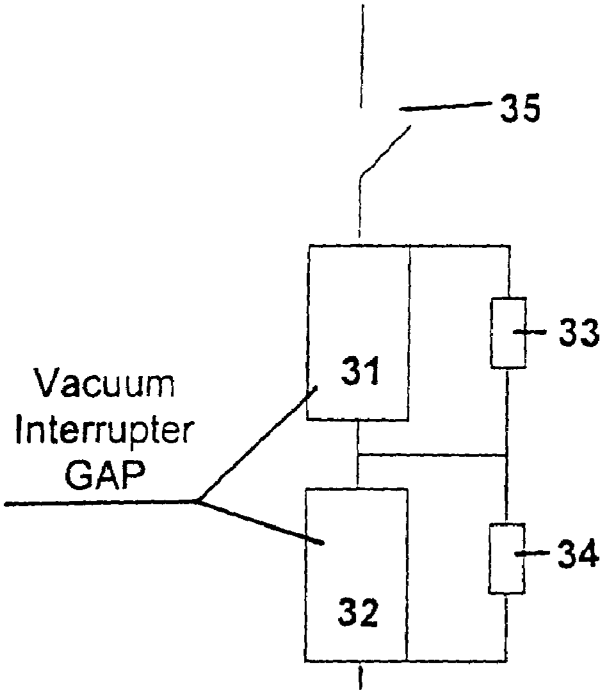
FIG. 5A is block circuit diagram of a configuration of auxiliary contact gaps and disconnection/load disconnection contact gaps according to the invention.
Figures 5B, 5C:
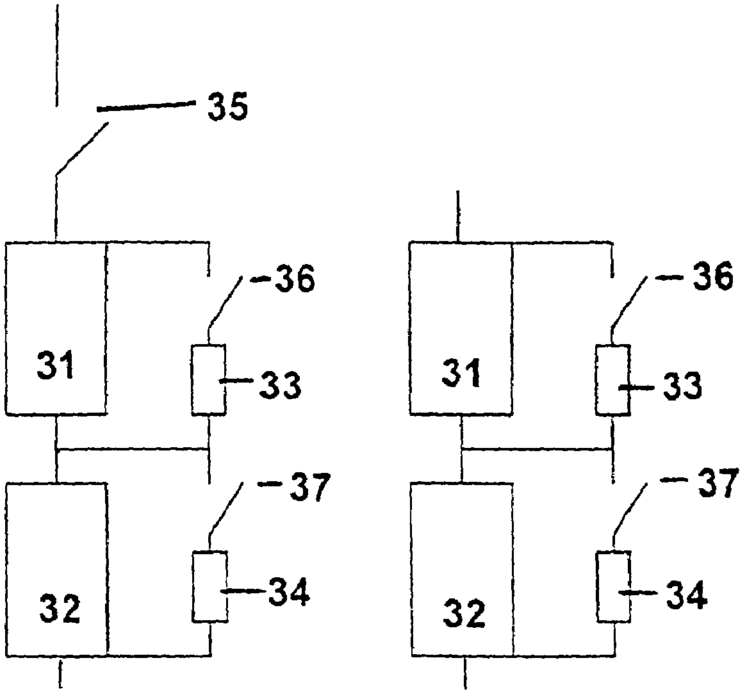
FIG. 5B is block circuit diagram of another configuration of the auxiliary contact gaps and disconnection/load disconnection contact gaps of FIG. 5A.
FIG. 5C is block circuit diagram of a configuration of the auxiliary contact gaps and disconnection/load disconnection contact gaps of FIG. 5A.

FIGS. 5A, 5B, 5C show, schematically, various variants relating to the configuration of auxiliary contact gaps and disconnection/load disconnection contact gaps. All three circuits have two series-connected vacuum interrupter gaps 31 and 32, with each vacuum interrupter gap 31, 32 being connected in parallel with a non-reactive control resistor 33 or 34, respectively. In the variants shown in FIGS. 5A and 5B, the series circuit formed by the vacuum interrupter gaps 31, 32 is connected in series with a disconnection/load disconnection contact gap 35. In the variant shown in FIG. 5B, in addition thereto, each non-reactive control resistor 33 or 34 is connected in series with a separate respective auxiliary contact gap 36 or 37. The variant shown in FIG. 5C corresponds to the variant shown in FIG. 5B, with the difference that there is no disconnection/load disconnection contact gap 35. A drive apparatus is, of course, once again, used to coordinate the timing of the drive for the switching devices.

Figure 6A:
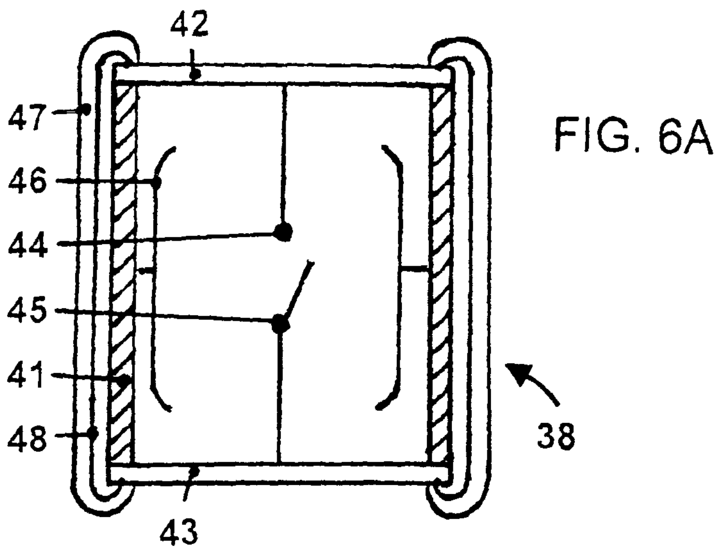
FIG. 6A is a cross-sectional view of a diagrammatic illustration of a vacuum interrupter chamber according to the invention.
Figure 6B:
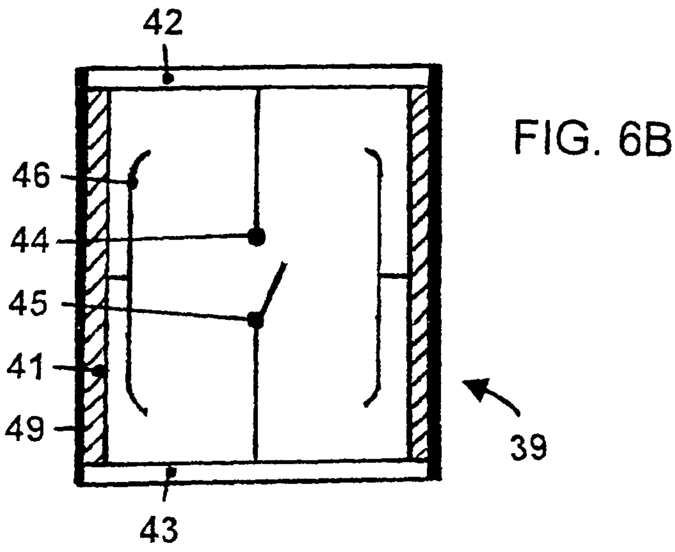
FIG. 6B is a cross-sectional view of an alternative embodiment of the vacuum interrupter chamber of FIG. 6A.
Figure 6C:
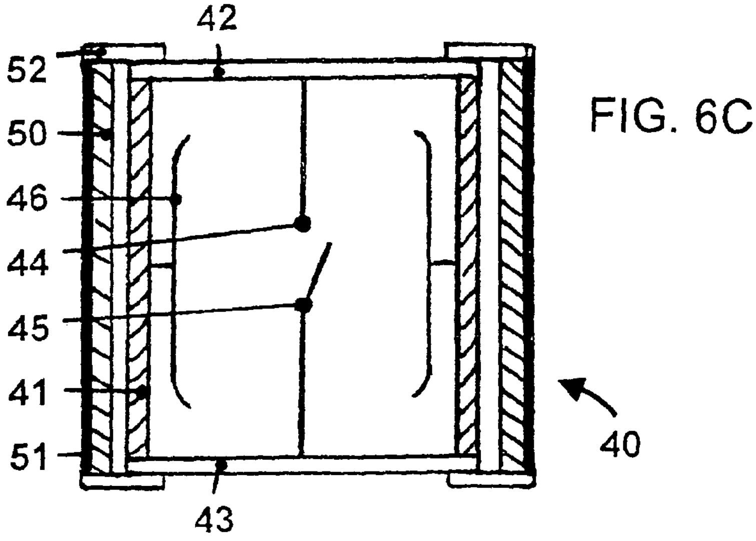
FIG. 6C is a cross-sectional view of another embodiment of the vacuum interrupter chamber of FIG. 6A.

FIGS. 6A, 6B, 6C show different embodiments of vacuum interrupter chambers 38, 39, 40. The illustrated vacuum interrupter chambers each include a ceramic hollow cylinder 41, end metal terminations 42, 43, switching contacts 44, 45 for providing vacuum interrupter gaps, and a screening electrode 46. In the embodiment shown in FIG. 6A, an embedding medium 47 or encapsulation, for example, composed of silicone, is applied directly to the vacuum interrupter chamber 38 and surrounds the ceramic hollow cylinder 41 and, in places (at the edges), the two metallic terminations 42, 43. A resistive layer 48 (non-reactive control resistance) is integrated in the embedding medium 47 and in this way merges concentrically onto the vacuum interrupter chamber. This resistive layer 48 is electrically connected to the two metallic terminations 42, 43.

In the embodiment shown in FIG. 6B, a resistive layer 49 (non-reactive control resistance) is vapor-deposited directly onto the ceramic hollow cylinder 41 of the vacuum interrupter chamber 39, and, as such, merges concentrically onto the vacuum interrupter chamber. In addition, the resistive layer 49 can be provided with a protective varnish. For the electrical connection between the resistive layer 49 and the metallic terminations 42, 43, the resistive layer 49 may also be vapor-deposited at the edge onto the metal terminations. Alternatively, the electrical connection between the resistive layer 49 and the metallic terminations 42, 43 can be provided through separate electrical connections.

In the embodiment shown in FIG. 6C, an isolating tube 50 with a resistive layer 51 (non-reactive control resistance) applied (preferably vapor-deposited) thereto is disposed concentrically around the vacuum interrupter chamber 40 and is mechanically and electrically connected thereto, with this being achieved, for example, by using circular rings 52 composed of electrically conductive material on both end faces, which engage over the edge regions of the metallic terminations 42, 43 and over the end faces of the isolating tube 50. In addition, the resistive layer 51 can be provided with a protective varnish.

We claim:

1. In a vacuum interrupter chamber having at least one vacuum interrupter gap, a control system comprising:

at least one non-reactive control resistor disposed in parallel with the vacuum interrupter gap, said at least one non-reactive control resistor merging concentrically onto the vacuum interrupter chamber and being mechanically and electrically coupled to the vacuum interrupter chamber for interrupting voltages above 1,000 volts.

2. The control system according to claim 1, further comprising an auxiliary contact gap connected in series with the vacuum interrupter gap.

3. The control system according to claim 1, further comprising a disconnection/load disconnection contact gap connected in series with the vacuum interrupter gap.

4. The control system according to claim 1, further comprising at least one of an auxiliary contact gap and disconnection/load disconnection contact gap connected in series with the vacuum interrupter gap.

5. The control system according to claim 1, further comprising an auxiliary contact gap connected in series with said at least one non-reactive control resistor.

6. The control system according to claim 1, further comprising a screen of a vacuum chamber is in the non-reactive control system.

7. The control system according to claim 1, further comprising a screen to be disposed in the vacuum interrupter chamber.

8. The control system according to claim 1, wherein:

the at least one vacuum interrupter gap is at least two vacuum interrupter gaps; and a multigap vacuum switch is connected in series with said at least two vacuum interrupter gaps and a non-reactive control system.

9. The control system according to claim 1, wherein:

the at least one vacuum interrupter gap is at least two vacuum interrupter gaps; and a multigap vacuum switch is connected in series with said at least two vacuum interrupter gaps and said at least one non-reactive control resistor.

10. The control system according to claim 4, further comprising a drive apparatus for coordinating a timing of a drive for at least one of:

the at least one vacuum interrupter gap;

the auxiliary contact gap; and the disconnection/load disconnection contact gap.

11. The control system according to claim 10, wherein said drive apparatus is a mechanical drive apparatus.

12. The control system according to claim 10, wherein said drive apparatus is an electronically controlled drive apparatus.

13. The control system according to claim 4, wherein the auxiliary contact gap is an isolating switch or a switch disconnector.

14. The control system according to claim 4, wherein the disconnection/load disconnection contact gap is an isolating switch or a switch disconnector.

15. The control system according to claim 1, wherein said at least one non-reactive control resistor is a conductive varnish having a complete coverage and a given layer thickness.

16. The control system according to claim 1, wherein said at least one non-reactive control resistor is a partial coverage conductive varnish with a given layer thickness.

17. The control system according to claim 1, wherein said at least one non-reactive control resistor is a conductive varnish with a given layer thickness at least partially covering the vacuum interrupter chamber.

18. The control system according to claim 1, wherein said at least one non-reactive control resistor is a resistance mesh.

19. The control system according to claim 18, further comprising an insulating material encapsulating said resistance mesh.

20. The control system according to claim 1, wherein said at least one non-reactive control resistor is a component of a pole part.

21. The control system according to claim 1, further comprising a pole part, said at least one non-reactive control resistor being a component of said pole part.

22. The control system according to claim 1, further comprising an outer shell, said at least one non-reactive control resistor being a component of said outer shell.

23. The control system according to claim 22, wherein said outer shell is an isolating tube.

24. The control system according to claim 1, further comprising a mounting element, said at least one non-reactive control resistor being a component of said mounting element.

25. A vacuum interrupter, comprising:

a vacuum interrupter housing defining a vacuum interrupter chamber having at least one vacuum interrupter gap for interrupting AC voltages above 1,000 volts; and a control system having at least one non-reactive control resistor disposed in parallel with said vacuum interrupter gap, said at least one non-reactive control resistor merging concentrically onto said vacuum interrupter chamber and being mechanically and electrically coupled to said vacuum interrupter chamber.

* * * * *